(12) United States Patent
Francois et al.

(10) Patent No.: US 8,321,611 B2
(45) Date of Patent: Nov. 27, 2012

(54) SYSTEM AND METHOD FOR ACCESSING A PERSONAL COMPUTER DEVICE ONBOARD AN AIRCRAFT AND AIRCRAFT EQUIPPED WITH SUCH SYSTEM

(75) Inventors: Bruno Francois, La Salvetat Saint Gilles (FR); Garrett Smith, Colomiers (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 12/679,997

(22) PCT Filed: Sep. 19, 2008

(86) PCT No.: PCT/FR2008/051688
§ 371 (c)(1),
(2), (4) Date: Mar. 25, 2010

(87) PCT Pub. No.: WO2009/047464
PCT Pub. Date: Apr. 16, 2009

(65) Prior Publication Data
US 2010/0205333 A1    Aug. 12, 2010

(30) Foreign Application Priority Data
Sep. 27, 2007   (FR) ..................... 07 57913

(51) Int. Cl.
*G06F 13/12* (2006.01)
*G06F 13/38* (2006.01)
*G06F 3/00* (2006.01)
(52) U.S. Cl. ............................. 710/62; 710/9
(58) Field of Classification Search ............. 710/62, 710/9
See application file for complete search history.

(56) References Cited

U.S. PATENT DOCUMENTS

| 6,757,712 | B1 | 6/2004 | Bastian et al. | |
|---|---|---|---|---|
| 7,830,897 | B1* | 11/2010 | Tannenbaum | 370/401 |
| 2002/0109647 | A1 | 8/2002 | Crandall et al. | |
| 2003/0233659 | A1 | 12/2003 | Guerin et al. | |
| 2005/0021602 | A1 | 1/2005 | Noel et al. | |
| 2006/0233191 | A1* | 10/2006 | Pirzada et al. | 370/463 |
| 2006/0244720 | A1* | 11/2006 | Tracy | 345/156 |
| 2007/0061847 | A1 | 3/2007 | Callahan et al. | |
| 2008/0061609 | A1 | 3/2008 | Williamson | |
| 2008/0080415 | A1* | 4/2008 | Stephenson et al. | 370/328 |

FOREIGN PATENT DOCUMENTS

| DE | 203 15 554 | 12/2003 |
|---|---|---|
| FR | 2 898 315 | 9/2007 |
| WO | 00 14987 | 3/2000 |
| WO | 03 067818 | 8/2003 |
| WO | 2007 093984 | 8/2007 |

* cited by examiner

*Primary Examiner* — Chun-Kuan Lee
*Assistant Examiner* — Farley Abad
(74) *Attorney, Agent, or Firm* — Oblon, Spivak, McClelland, Maier & Neustadt, L.L.P.

(57) ABSTRACT

The invention generally pertains to onboard systems for passengers such as In-Flight Entertainment (IFE) Systems. The invention more particularly relates to a system and a method for accessing a personal computer device (3) onboard an aircraft and to an aircraft including such a system. The system includes an onboard network (12) to which is connected at least one interface (4) at a passenger's seat (si) and connection means. The system is arranged so that said interface and said personal computer device interact via the transmission of data on said onboard network.

18 Claims, 6 Drawing Sheets

SYSTEM AND METHOD FOR ACCESSING A PERSONAL COMPUTER DEVICE ONBOARD AN AIRCRAFT AND AIRCRAFT EQUIPPED WITH SUCH SYSTEM

The invention relates to the aeronautical domain and in general concerns the on-board systems intended for the passengers, such as the in-flight entertainment systems (in English "In-Flight Entertainment [IFE] system").

More particularly, the invention proposes a system and a method for accessing a personal computer equipment item on board an aircraft. The invention also relates to an aircraft equipped with a system according to the invention.

IFE systems are widely used in present-day commercial aircraft and make it possible to deploy in-flight services to the passengers, for example a movies-on-demand service, a broadcasting service, a real-time flight information service. An IFE system generally comprises one or more central servers having an intelligence for running the services, a folding display screen fastened to each seat facing a passenger (seat in front), and a remote control at each seat for interacting with the central server, as well as a network connecting these various equipment items. These IFE systems are uncoupled from the personal equipment items transported and used in the cabin by the passengers.

Various IFE information systems are presented in the patent applications US2003160706, WO2007093327 and WO2007093403.

The passengers regularly spend a portion of their flights working on personal computers or playing on electronic devices. In use, these equipment items, hereinafter called personal computer items, are placed on the opened-out shelf facing the passenger.

Particularly in economy class, the cabin configuration considerably limits the space between two rows of seats. The result is that the personal computer equipment items can occupy a not-insignificant part of this space, diminishing the comfort of the passenger.

For example, the more the seat in front facing the passenger is tilted in stretched-out position, the more a portable computer the screen of which is open must be placed in a forward position on the passenger's shelf in order that the back of the seat in front does not hinder the opening of the screen. In this case, the computer is too close to the passenger to allow a comfortable use thereof.

There thus exists a need to improve the passengers' comfort for accessing the data of their personal computer equipment items or controlling these personal computer equipment items.

To this end, in particular, the invention applies to a system for accessing a personal computer equipment item on board an aircraft, the system comprising an on-board network to which there is connected at least one interface at a passenger seat, the system comprising connection means arranged for connecting the said personal computer equipment item to the said on-board network, and the system being arranged in such a way that the said interface and the said personal computer equipment item interact (together) through the transmission of data on the said on-board network.

This invention thus is based, in particular, on the interfacing of these personal computer equipment items with a network of the on-board system already existing in the aircraft cabin and by the use of interfaces already existing at the seats, such as a screen, to interact remotely with these personal equipment items.

In this way, these equipment items are no longer necessarily on the shelf or in the limited personal space of the passenger. The comfort of the passenger thus is enhanced.

The on-board network, the available interfaces and possible associated peripherals and network equipment items ensure a standard access and use of the interfaced personal equipment item. The passenger thus can use specific files saved on his portable computer. In this way the passenger retains the traditional environment of his portable computer/personal equipment item.

By way of example, the on-board network can be the network of an on-board system for providing in-flight services to the passengers, for example an IFE system. The invention thus can be deployed at lower cost by utilizing the systems widely used and installed in present-day aircraft cabins.

The interface of the on-board system at the passenger seat is, for example, a display screen, a touch screen or an individual IFE control. The individual IFE control is understood as the set of keys placed at a passenger seat which allow this passenger to interact with the on-board IFE system, for example for the selection of movies.

Access to the data of the personal computer equipment item just as easily comprises the display of data on the interface as the manipulation of such data by the sending of commands or instructions generated by the passenger through the interface. According to the invention, this access is implemented by the use of the on-board network, for example through transmission, on this network, of display data to the display interface or of interaction data generated through the interface to the connected personal equipment item. By way of example, the transmission of data can be implemented according to the IP ("Internet Protocol") protocol.

In one embodiment, the said at least one interface comprises a display screen. Since the existing on-board systems in aircraft already are equipped with individual LCD ("Liquid Crystal Display") type display screens, these interfaces are used, according to the invention. The number of additional peripherals for the functioning of the personal equipment item also can be reduced.

The use of the already existing display screens also offers the passenger an ergonomic advantage. In fact, the screen is positioned in front of the passenger, at eye level. On the contrary, the portable computer placed on a shelf requires the passenger to lower his eyes.

In order to offer interactive capabilities with the personal computer equipment item, it is provided that the system comprises at least one data-entry peripheral at the passenger seat, the peripheral being connected to the said on-board network and being arranged to interact with the said personal computer equipment item through the transmission of data on the said on-board network.

In particular, the said data-entry peripheral comprises a projector/sensor projecting a virtual keyboard on a flat surface. A virtual keyboard projector/sensor is the combination, possibly within one device, of a means for projection of an image of a keyboard with keys over an area and a sensor means capable of determining the interaction of a user with any one of the projected keys. This solution is compact, non-invasive and therefore favorable to an increased passenger comfort. Moreover, it offers the passenger an additional ergonomic comfort because the thickness of the portable computer no longer is present. In this way the keyboard is better positioned and no longer necessitates "breaking" the wrists during typing.

In particular, the said projector/sensor is mounted on the back of the seat immediately in front of the said passenger seat in the longitudinal direction of the sitting surface. In the traditional configurations of aircraft cabins, the said back corresponds to the rear face of the back facing the passenger. This integration of the projector/sensor is advantageous in that the virtual keyboard is presented opposite the passenger. Thus no preliminary deployment or installation of the projector/sensor is necessary.

In particular, the said flat surface comprises a shelf mounted movable on the said seat back, which allows an optimal use of the already existing equipment items (here the shelf). The shelf is movable along a horizontal axis so as to provide the passenger with a more or less horizontal surface.

According to one embodiment of the invention, it also is provided that the system comprises pointer-type means at the said passenger seat connected to the said on-board network and arranged to interact with the personal computer equipment item through the transmission of data on the said on-board network. These pointer means, for example a computer mouse, are complementary to the data-entry peripheral and contribute to providing the passengers with a traditional computer environment.

More particularly, the said interface comprises the said pointer-type means. In particular, the said interface is a touch screen the pointer means of which are operated by the activation of the touch-sensitive property of the screen. The said interface also can be an individual control associated with a system for providing services supporting the said on-board network.

In these configurations, the equipment items already deployed in the aircraft for the on-board system/network, for example of IFE ("In-Flight Entertainment") type advantageously are reused.

According to a variant or optionally in addition, the said pointer-type means comprise a peripheral pointer equipment item, for example a traditional wired or wireless computer mouse, connected to the said on-board network at the said passenger seat. The connection can be implemented through a USB ("Universal Serial Bus") cord and a corresponding USB outlet supplying the passenger seats.

In one embodiment, the system comprises a housing arranged to accommodate and supply the said personal computer equipment item with the said connection to the on-board network.

The ad hoc housing makes it possible to relieve the passenger of the presence of his computer equipment during the entire flight, while ensuring a connection to the on-board network and therefore an access, for the passenger, to his data through the interface.

The portable computer placed in the housing also no longer is subjected to the risks of damage connected with unforeseeable movements of the facing seat, to which the shelf supporting the computer is attached.

In particular, the said housing comprises electrical connection means for supplying the said personal computer equipment item in accommodation position, which prevents the personal equipment item or computer from turning off during the flight because of a dead battery.

It also is provided that the said housing is positioned underneath the passenger seat. In this way, the passenger's personal space is not encroached upon and access to the personal equipment item in the housing remains easy and rapid.

As an alternative, the housing may be, for example, a dedicated monument positioned in the cabin of the aircraft. The dedicated monument is a storage space accommodating the personal equipment items of any passenger.

According to one embodiment, the said on-board network comprises a wireless network, for example Wifi, and the said connection means comprise a terminal for wireless connection to the said wireless network. No physical branching manipulation is necessary. In this way, connection of the personal equipment item to the network comes to be facilitated.

According to an alternative, the said on-board network comprises a wired Ethernet network and the said connection means comprise an Ethernet connector. The connector then is placed in the appropriate housing for accommodating the personal equipment items.

In one embodiment, the system further comprises an on-board communication system connected with the said on-board network, the said communication system being arranged to be connected to a communication system outside the said aircraft. Such an on-board system for communication to an outside network can be, by way of example, a SATCOM system (communication by satellite). The two networks are connected by a network gateway. In this way the passenger can access remotely files saved on a computer on the ground.

The system can comprise, at the said passenger seat, a port arranged to connect a storage peripheral to the on-board network. In this way it is easy for the passenger to connect a storage equipment item, for example a portable hard disk or a USB key, directly to the system, and to access the data stored thereon. The storage equipment item and the connection port can be according to the USB standard.

The system can comprise a printer networked on the said on-board network inside the aircraft, offering the passenger a complete computer environment. In this way the passenger can make copies from his seat.

The invention also relates to a method for accessing a personal computer equipment item on board an aircraft, comprising an on-board network to which there is connected at least one interface at a passenger seat, the method comprising a step of connecting the said personal computer equipment item to the said on-board network, and a step of interacting between the said interface and the said personal computer equipment item through the transmission of data on the said on-board network, so as to allow the passenger access to the said data through the interface.

Optionally, the method can comprise steps relating to the system characteristics presented above.

The invention also concerns an aircraft comprising such a system for accessing a personal computer equipment item on board an aircraft.

One advantage of the invention is to free up space for the passenger. Cluttering of the shelf thus is avoided, for example when the tray meal is served.

The invention applies particularly well to the "economy" and "enhanced economy" classes, but also can be used in all classes as well as specific cabin spaces. A use for the crew also is contemplated.

The characteristics and advantages of this invention will emerge more clearly upon reading of a preferred embodiment illustrated by the attached drawings, in which.

According to a selected embodiment, an aircraft cabin is equipped with an in-flight entertainment system 1, also called IFE system. The IFE system 1 comprises a central system 10 bringing together one or more servers, hereinafter designated as central server, which comprises hardware and software resources for distributing services, for example video on demand, music, games, flight information, to LCD screens 11 with which the backs of the passenger seats Si are equipped.

Figure 1:
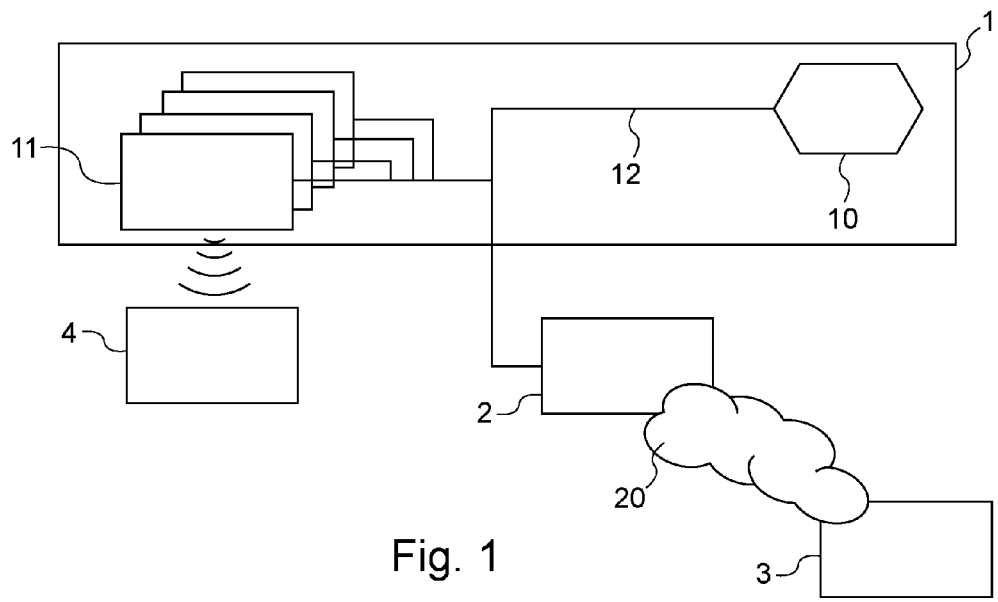
FIG. 1 is an overall view of the system according to the invention.

Other individual terminals accessible at the passenger seats also can be provided, such as, for example, individual IFE controls, also called PCU ("Passenger Control Unit") 13 (not shown on FIG. 1) which allow browsing and selection in the menus offered by the central server 10 and displayed on the individual screen 11.

Screens 11 and the possible individual controls 13 are connected to the network 12 through specialized IFE housings installed in the passenger seats, such as known to the individual skilled in the art.

IFE system 1 deployed in the aircraft is made up of an Ethernet network to which the set of equipment items server 10 and terminals 11 is connected.

For the implementation of the invention, the IFE system 1 is equipped with a connection means 2 arranged for connecting a personal equipment item 3 to the network 12. As described hereinafter with reference to FIGS. 2a to 2d, the connection means can assume different forms, in particular a simple Ethernet cable or a wireless connection terminal, for example of the type meeting IEEE standard 802.11, commonly designated as "Wifi."

In particular, the connection terminal 2 preferably is a Wifi terminal in the form of a wired leaky-type ("Leaky line" according to English terminology) antenna. The leaky line in particular is made up of one or more cables with leakage zones in the form of shielded antenna cables on which the shielding has been removed over, for example, approximately 10 cm every 1 meter.

As an alternative, a standard wireless network access terminal ("Cabin Wireless LAN Unit" or CWLU according to English terminology) can be used as connection terminal 2.

The personal computer equipment item 3 covers at once portable computers, personal assistants, portable telephones, game consoles and any other electronic device equipped with means for connection with a communication network 12. Hereinafter, reference is made to a portable 3 equipped with a Wifi connection to the IFE network 12 through the access terminal 2.

Server 10 ensures connectivity of the computer 3 to the network 12 and the transfer of data from or to this computer.

A data-entry keyboard 4 is supplied to the passenger.

Keyboard 4 can be a physical keyboard connected to the network 12 by a USB or PS/2 ("Personal System/2") interface.

Preferably, the keyboard 4 is a virtual laser keyboard projected on the opened-out shelf with which the seat facing the passenger is equipped. The keyboard 4 is formed from a laser projector driven by computer means connected to the network 12 and a sensor capable of detecting the interaction of the passenger with the virtual keyboard projected at the shelf. The projector/sensor module 40 is connected to the IFE system 1 through a USB connection with the IFE housing installed in the passenger seat.

The projector/sensor set 40 can be integrated into the block forming the LCD screen mounted movable along a horizontal axis on the back of the seat.

As an alternative, the block 40 can constitute an independent module on the back of the seat.

If need be, the block 40 can be integrated into the headrest portion.

As an alternative, the block 40 is integrated into the shelf system.

In order to provide the traditional tools of a computer environment, the LCD screen 11 is, for example, touch-sensitive, and thus provides a pointer-computer mouse function, also called "Smart Video Display Unit" (SVDU).

As a variant, a physical computer mouse can be provided, for example in the form:
of a mouse pen or standard mouse connected to the network 12 through a USB port provided on the passenger seat,
of a touch pad ("touch pad") positioned on a passenger armrest and connected to the network 12 by USB wired link, or
of a digital block of the individual IFE control 13 already integrated into the IFE system 1.

Remote-control mechanisms for equipment items and/or software on a computer network are implemented by the server 10 or a second equivalent server on the network.

In an embodiment where the running of programs is carried out on computer 3, display data are generated by computer 3 to Wifu terminal 2 which transmits the data on network 12. The means of the server 10 allow display of these data on the passenger's screen 11.

When the user generates a command through activation either of a key of the keyboard 4 or the pointing device, a command message is generated, then transmitted on the network to the computer 3. The latter, upon receiving the message, executes the command and transmits the data for updating the display to the screen 11 involved.

In this embodiment, provision is made for the installation of an ad hoc software on the personal computer 3 by the user before the flight in order to favor recognition of the IP address of the computer 3 by the IFE system 1 and in this way to allow him access to the network 12 through a possible firewall during the flight. With this software and a corresponding software offered by the IFE system 1, the passenger creates his own private network VPN for which the IFE system 1 and its on-board network 12 contribute only a function of transfer of data (for display and commands). The running of the applications is performed on the personal computer 3, which is advantageous when it is noted that the passengers' computers 3 generally are more high-performance than the servers 10 of the IFE system 1.

The passenger runs the corresponding software offered by the IFE system and authenticates himself in order to create his VPN with the ad hoc software present on the computer. This configuration can be of the client (software on the IFE system) and server (ad hoc software on the computer 3) type.

Authentication can be performed by virtue of a specific USB key in a remote connection mechanism, by virtue of a personal code or else by virtue of a token ("token") according to English terminology).

In an embodiment where the passenger uses software supplied by the server 10, the computer 3 appears as a network disk from which the passenger can load personal files in order to display them on the screen 11.

In order to allow display of the data from the computer 3 on the screen 11 of the passenger owning this computer 3, an association between the computer and the corresponding passenger seat is made.

This association can be made manually at the time of connection of the computer 3 to the Wifi network 20 of the terminal 2, for example by indicating the seat number used in an ad hoc computer interface.

As an alternative, a physical connector associated with the passenger's seat can be available for connecting his computer to the network. This connector is defined at the network with an address associated with the corresponding seat.

Figure 2A:
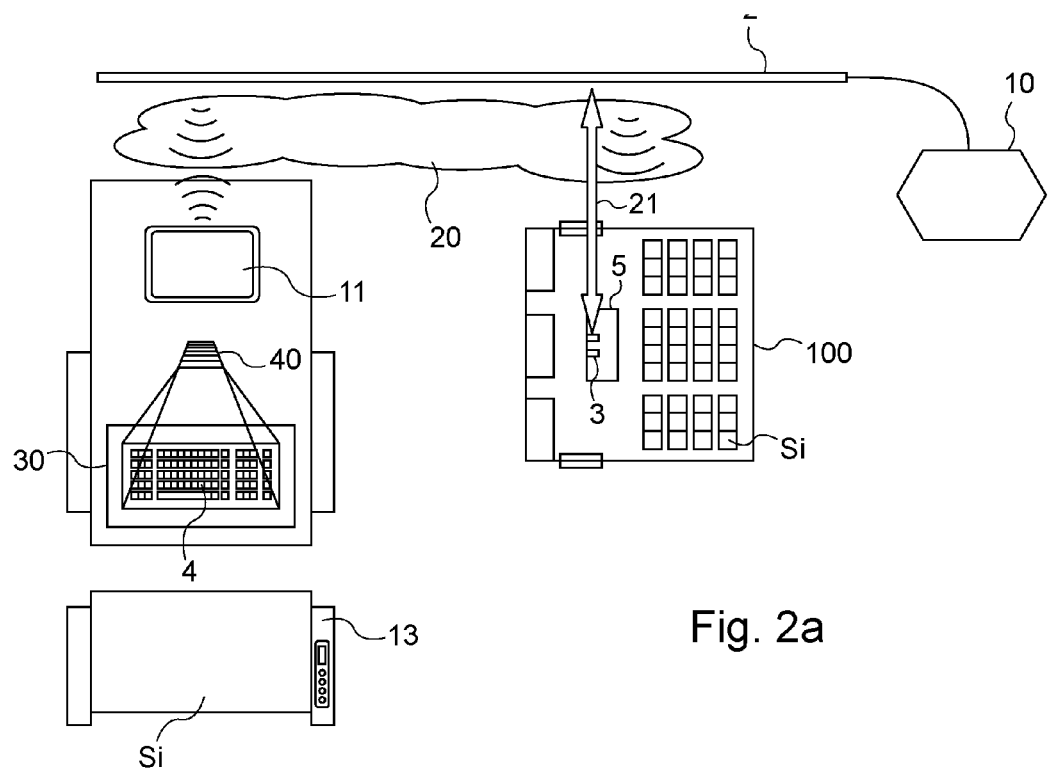
FIGS. 2a to 2d show embodiment alternatives of this invention.

A first configuration of the system according of the invention is illustrated by FIG. 2a.

Computer 3 is placed in a compartment 5 of the aircraft cabin 100, the compartment being devoted to the accommodation of personal electronic equipment items.

The compartment is, for example, a housing provided underneath the passenger's seat, a general baggage storage space, in particular an overhead compartment.

The compartment comprises electrical current outlets for supplying the computer, for example traditional outlets requiring the use of a supply cord, or USB connectors that make it possible to provide power from a computer network or system.

Ventilation means also can be provided for the compartment, in particular when the latter is shared by several passenger computers.

In this embodiment, the computer 3 is connected to the network 12 of the IFE 1 through the Wifi network 20 formed by the Leaky line antenna. The wireless link (arrow 21) ensures a bidirectional connection of the computer 3 to the network 12.

A virtual laser keyboard 40 such as described above is provided on the back of the seat in front.

The same wireless network 20 makes it possible to connect the LCD screen 11 and the keyboard 40 equipment item to the IFE network.

Figure 2B:
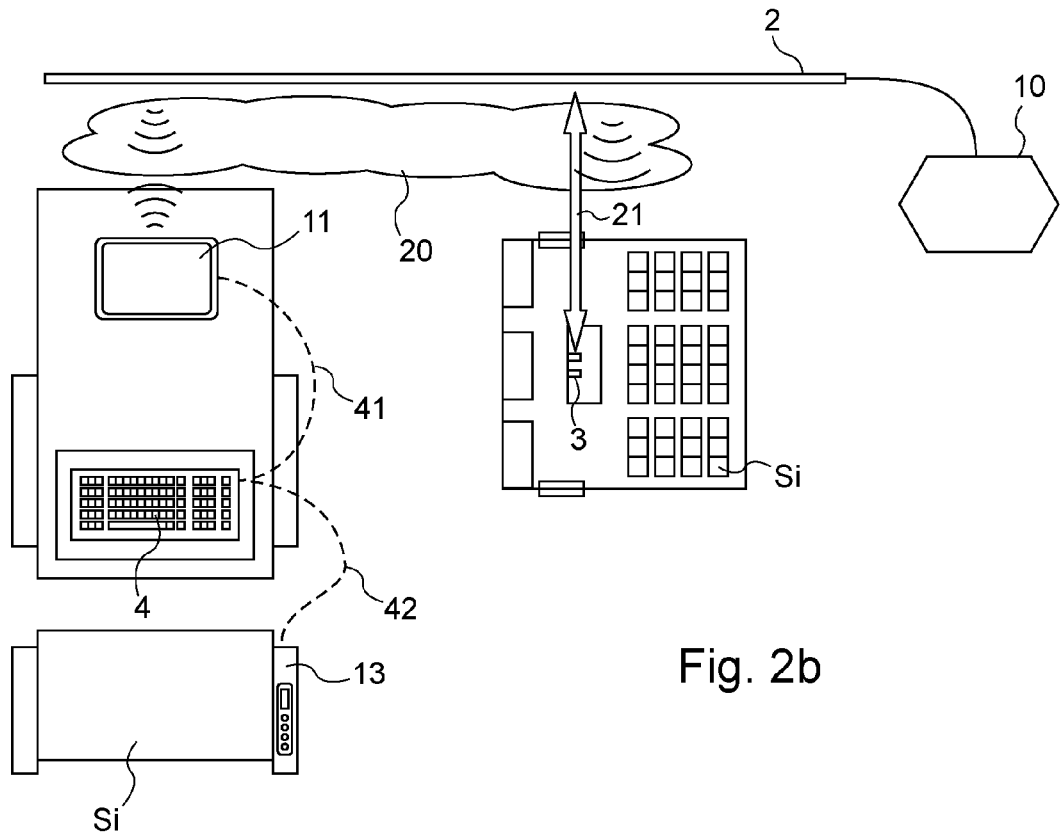

In the second configuration proposed with reference to FIG. 2b, the computer 3 is always connected to the network 12 via the terminal 2, ensuring a bidirectional communication (arrow).

A removable physical keyboard 4 is provided at the passenger level. The connection of the keyboard 4 to the network 12 is provided, for example, either by a physical link 41 to a USB port provided with the LCD screen 11, or by a physical link 42, also USB, provided with the passenger's individual control unit PCU 13.

Figure 2C:
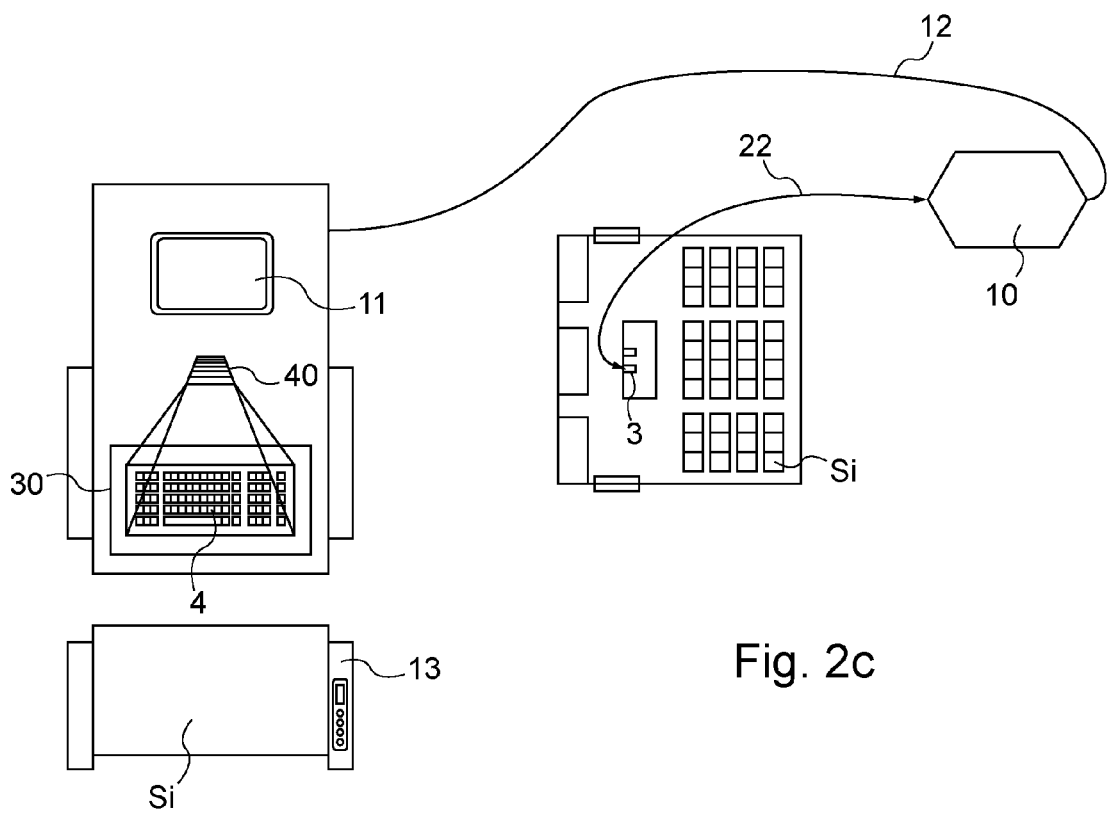

In the configuration of FIG. 2c, an Ethernet-type wired link 22 is used to connect the computer 3 to the IFE system 1. The IFE network 12 to which the LCD screens 11 are connected also is of wire type.

The virtual keyboard 4 is of the same type as that of FIG. 2a.

Figure 2D:
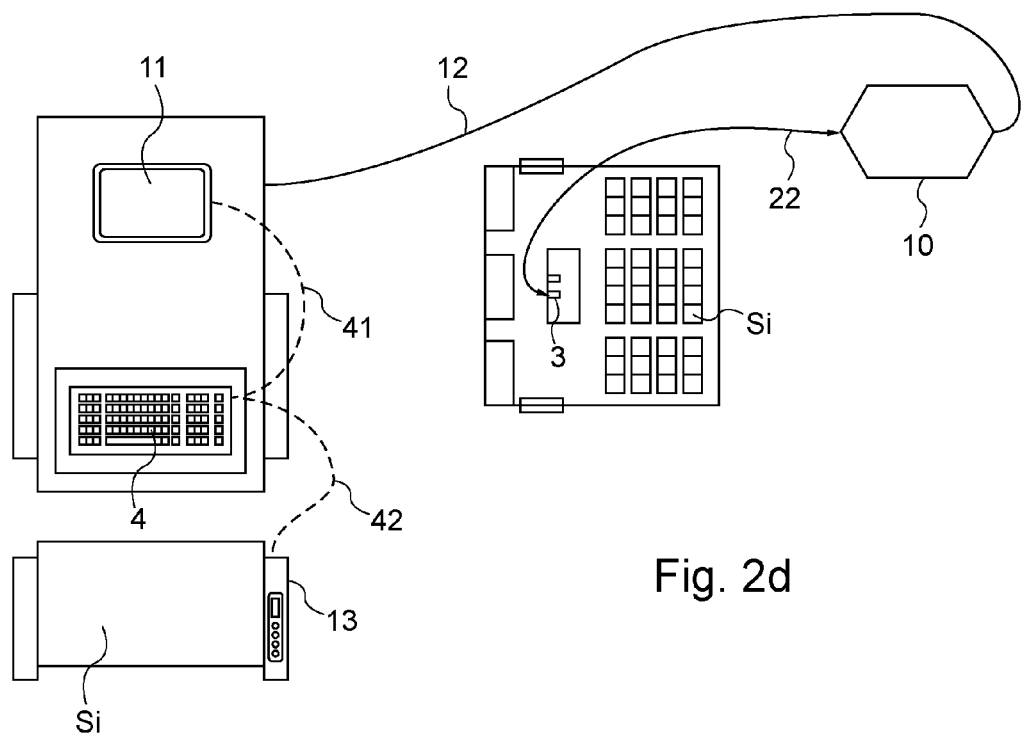

The configuration of FIG. 2d brings together a wired network of the type of that of FIG. 2c to connect the computer 3 to the IFE network 12, and a physical keyboard 4 similar to that of the configuration of FIG. 2b.

Figure 5A:
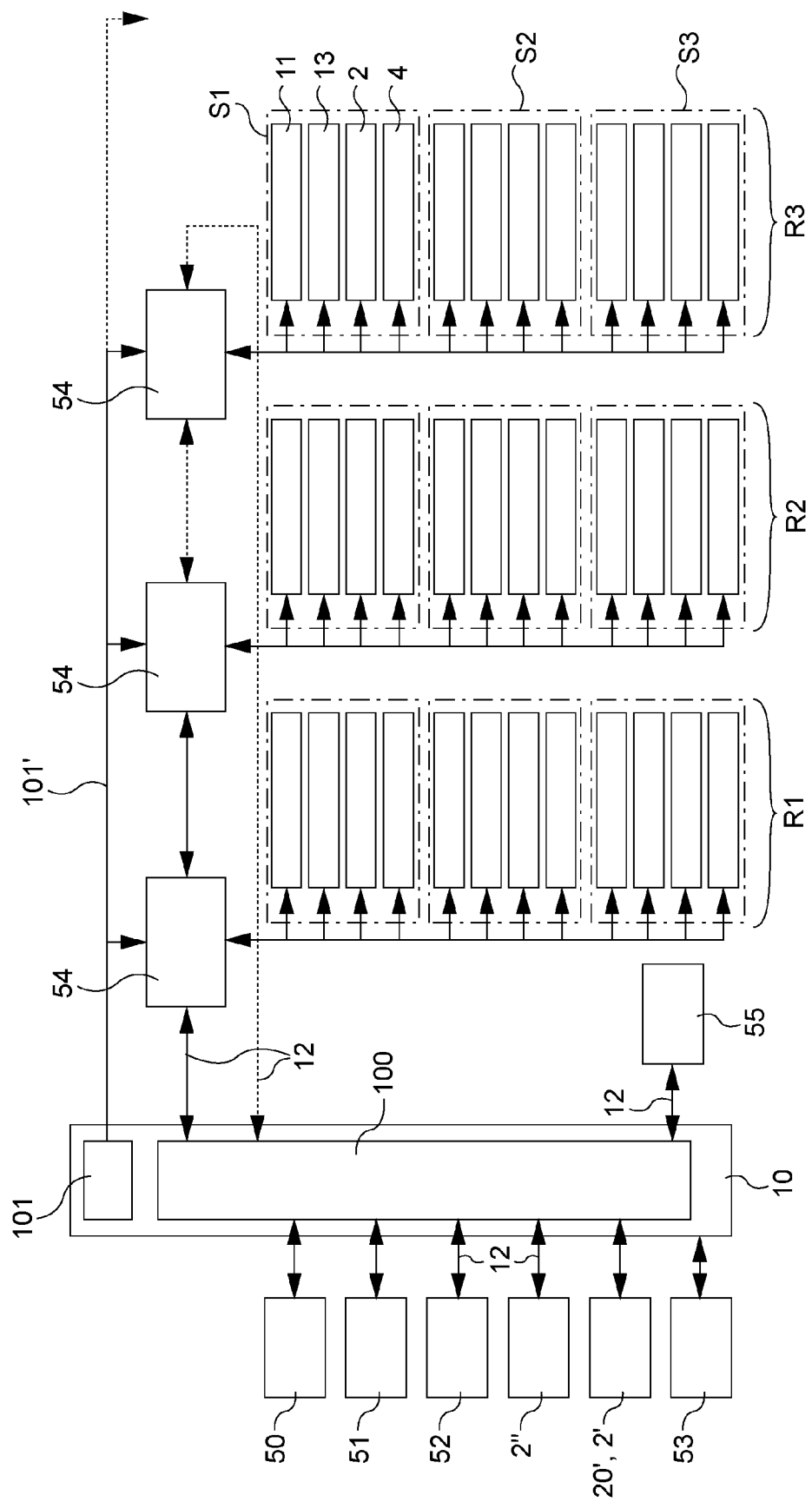
FIGS. 5a and 5b illustrate the deployment of the system according to the invention in an aircraft cabin.
Figure 5B:
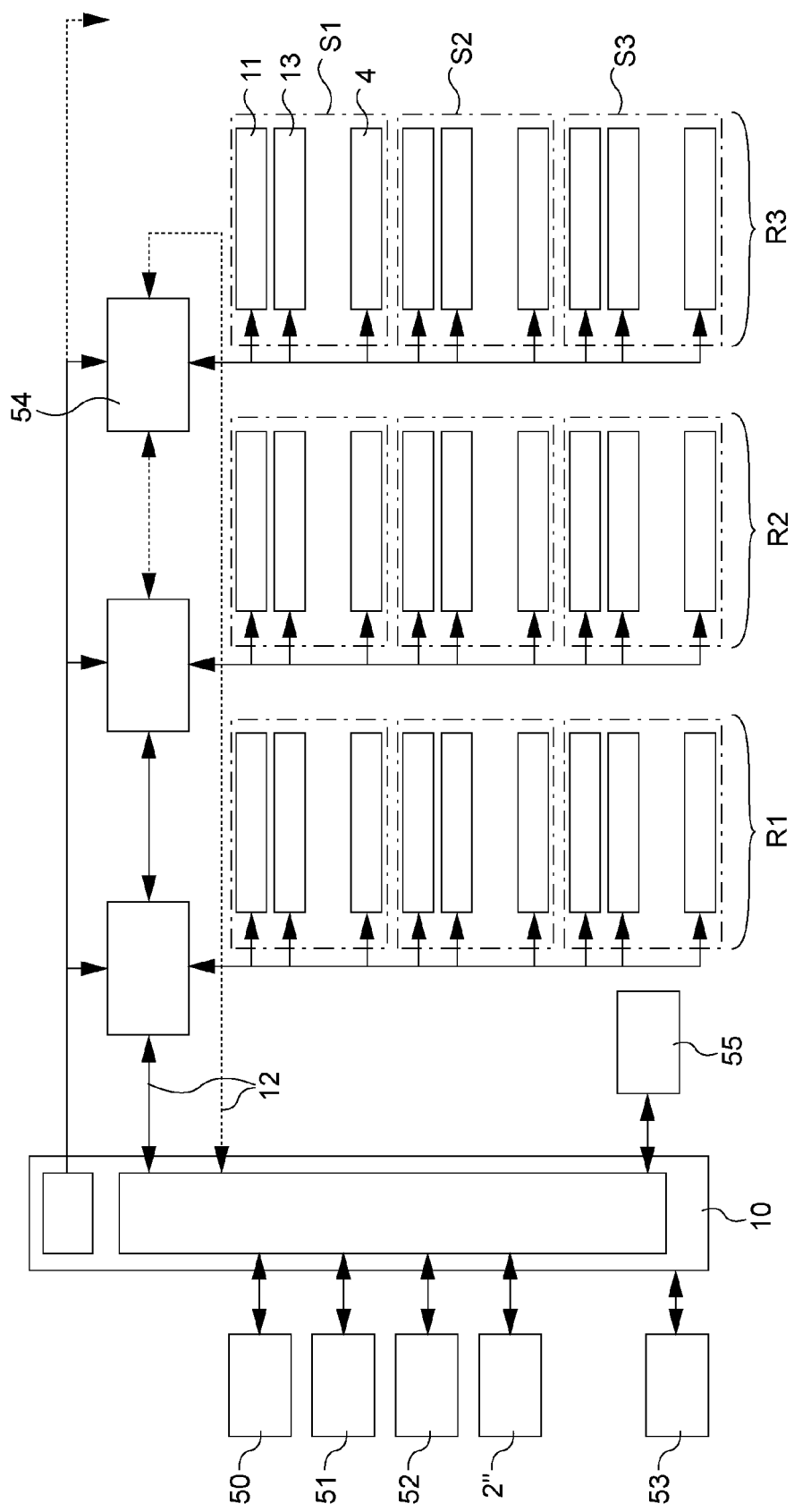

In greater detail, FIGS. 5a and 5b show the system architecture of this invention at three rows R1-R3 of three seats S1-S3, according to two embodiments:
  on FIG. 5a, a "mixed" embodiment combining Ethernet connection and wireless connection;
  on FIG. 5b, a "simple" embodiment based solely on an Ethernet connection.

In the "mixed" embodiment, the central IFE system 10 comprises a main Ethernet server 100 and a supply source 101 supplying the various equipment items that are connected thereto by a supply line 101'.

The main Ethernet server 100 has means for allowing connectivity between the various equipment items of the Ethernet network 12.

Different equipment items providing entertainment services or for the use of the crew are connected to the IFE server 10 by Ethernet network: audio/video on demand server 50; entry point 51, generally intended to accommodate a microphone, for the crew; emergency interface 51, for example in case of decompression in order to distribute a message on all the interfaces at the passenger seats; SATCOM system 53 for a connection with a network outside the aircraft.

IFE server 10 distributes the services on the Ethernet IFE network 12 to the IFE junction housings 54 at the seats.

IFE housing 54 can be dedicated and connected to a single seat Si or to a row Ri as illustrated on FIG. 5a.

At each seat, the IFE housing 54 ensures the electrical supply and the connection with the IFE network 12 to all the following equipment items that are connected thereto: the individual LCD screen 11 of a type described above with reference to FIGS. 1 and 2, the individual PCU unit 13, a keyboard 4 of a type described above with reference to FIGS. 1 and 2, and a wireless Wifi-type individual antenna 2.

Wireless antenna 2 can be of short range. The connection to the network 12 from this antenna 2 thus is possible only for a personal equipment item 3 in the possession of the passenger in the seat, for example inside a housing provided for this purpose underneath the seat and accommodating antenna 2. By placing the personal computer 3 in such a housing, the risks of damaging it when the seat in front tilts its back are thus avoided.

In this case, physical identification data of this antenna 2 are associated with the passenger seat. When a personal equipment item 3 is connected with this antenna, an automatic association is made with the IFE server 10 on the basis of identification data of the antenna 2 at the passenger's seat. In this way the peripherals of the passenger seat are associated with the personal equipment item 3 connected so as to allow an effective display on the correct screen 11 and a correct interpretation of the interactions at the peripherals of the seat, keyboard or mouse for example.

The individual PCU unit 13 comprises the traditional functions of an individual IFE control and additional computer ports to which peripherals, for example a mouse, a keyboard, an external hard disk, a USB key, can be connected.

The computer ports used are in accordance with standards, for example USB, Ethernet RJ-45, "firewire" IEE 1394, PS/2.

The SATCOM 53 system is interfaced with the IFE network 12 in traditional manner; in particular it comprises network gateway functions. In this way, it allows the passengers, from their seats in the aircraft, to consult and work on files saved on computers located in the office and/or in their homes.

The "mixed" configuration of FIG. 5 also comprises a printer 55 connected to the Ethernet network 12. This (or these) printer(s) 55 has/have a standard network printer configuration, which makes it possible to do printing work from each of the seats through standard commands formulated on the interfaces 11 or keyboard and/or mouse peripherals, for example.

A Leaky-line type Wifi 2' antenna is connected to the IFE server 10 and offers an overall wireless WLAN network 20' (or CWL—"Cabin Wireless LAN" according to English terminology) for the entire cabin of the aircraft.

A personal equipment item 3 can be connected to the IFE system 10 and to the IFE network 12 through this overall WLAN network 20', by means of which a procedure for association of the equipment item 3 with a passenger seat must be carried out manually.

A docking station 2" for portable computers 3 also is provided in the cabin of the aircraft. This docking station supplies electrical connectors for supply and connection to the IFE network 12. The docking station 2" is connected to the IFE network through Ethernet wire connections It thus is observed that the passengers can connect their personal equipment items 3 in three different ways:

connection through a local Wifi network 20 to each seat, for example in a dedicated housing underneath the seat,
connection through an overall Wifi network 20' to the aircraft, or
wired connection from a docking station 2".

The "simple" embodiment of FIG. 5b is based on a network infrastructure similar to that of the "mixed" embodiment, in which no wireless network is present for connecting the personal equipment items 3. That being the case, the connection of the latter 3 to the IFE network 12 is achieved only through the docking station 2".

Figure 6A:
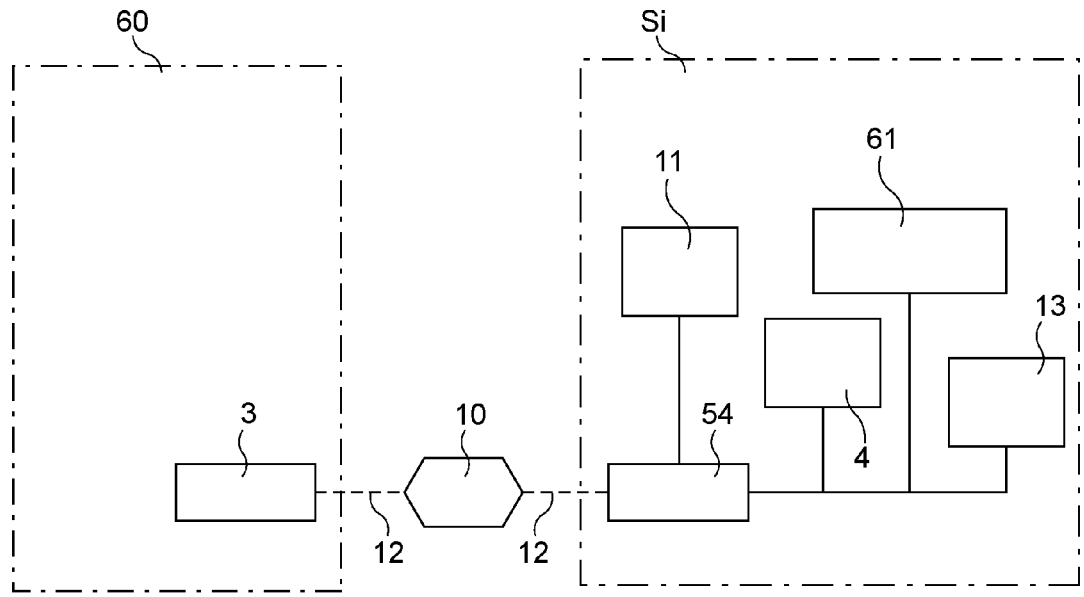
FIGS. 6a and 6b illustrate the deployment of the system according to the invention at a passenger seat.
Figure 6B:
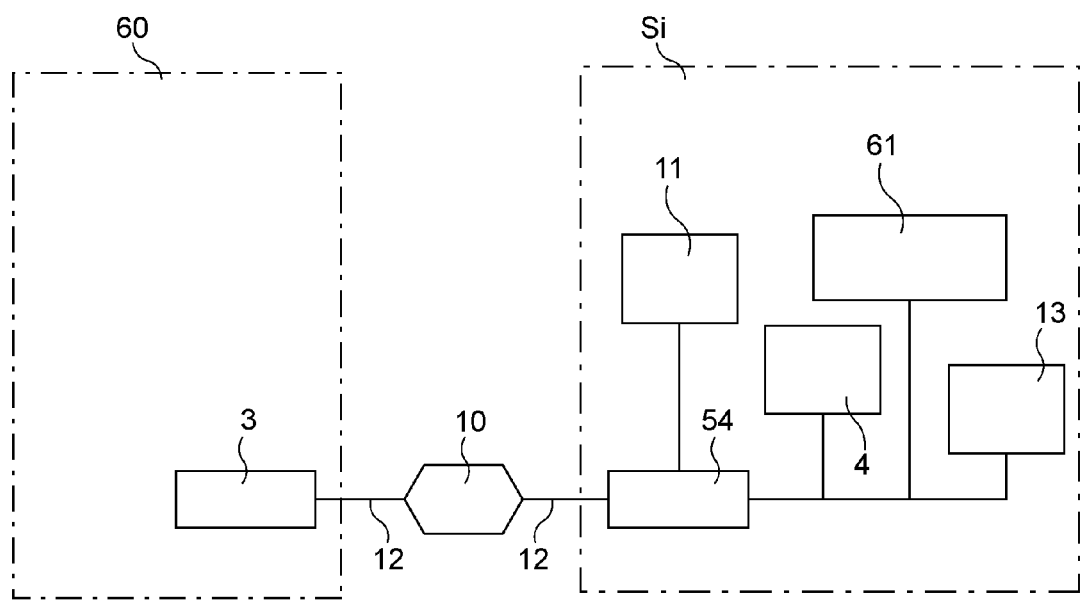

FIGS. 6a and 6b describe the system at a passenger seat Si.

In the configuration of FIG. 6a, the personal computer 3 is stored in an ad hoc housing 60 and connected to the wireless IFE network 12.

The central IFE server 10 is connected to this wireless IFE network 12 to control the various equipment items of the network, in particular the peripherals and interfaces at the passenger seat Si.

The display screen 11, a physical or virtual keyboard 4, an individual control unit 13 and individual connection ports 61, for example of USB, IEEE1394, RS/2, RJ/45 type, are connected to the network 12 through an IFE seat housing 54.

The link between, on the one hand, the keyboard 4, the IFE control 13 and the connection ports 61 and, on the other hand, the box 54 is wired.

IFE housing 54 is equipped with a wireless connection interface, for example a Wifi network board, to be connected to the network 12.

In use, the IFE server 10 supports the running of applications selected by a passenger through interfaces and peripherals. In which case, portable computer 3 "appears" as a virtual disc, in the computer sense, on the network 12.

Requests for data are sent by the server 10 to the personal computer 3 during running of the applications. A return message sends back the information items to the server 10.

When the passenger interacts with the keyboard 4 or a mouse at his seat, a command is transmitted to the server 10 and is relayed by the housing 54 on the IFE network 12. Upon receiving the command, the server 10 executes the latter in traditional manner, then sends back a signal for updating the display on the passenger's screen 11 in order to restore the progress of running the applications.

By the use of these various mechanisms, the passenger has access to his personal data stored through the IFE network 12.

In the configuration of FIG. 6b, the system is similar with the exception that the network 12 is of wired Ethernet type. Consequently, personal computer 3 is connected to the IFE network 12 and to the IFE server 10 by an Ethernet cable and RJ-45 connectors, or a docking station for example, and the personal IFE housings 54 are connected by wired Ethernet means to the IFE server 10.

The mechanisms for running applications and exchanges of messages between the various equipment items remain unchanged.

Figure 3:
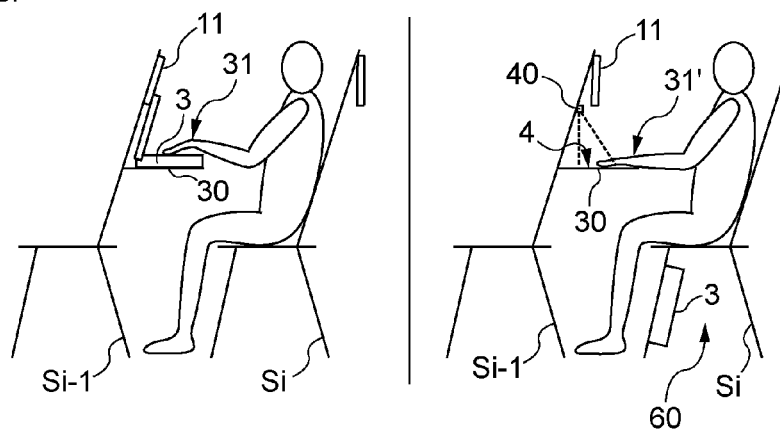
FIGS. 3 and 4 illustrate the enhancement of the passengers' comfort through the use of this invention.
Figure 4:
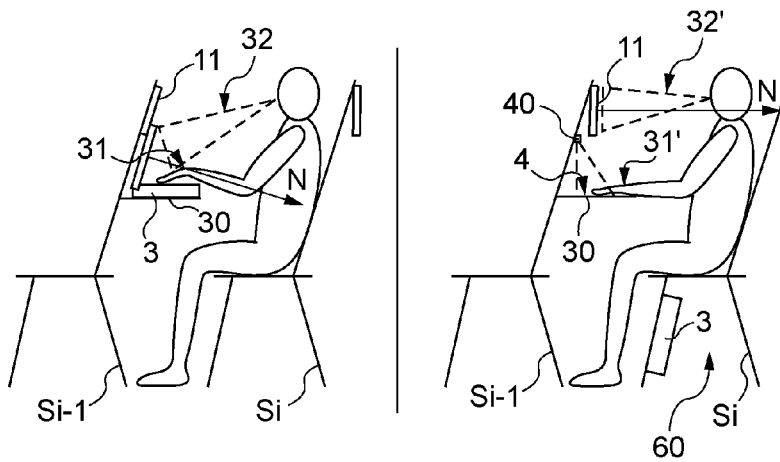

Advantages of this invention emerge more clearly in the light of FIGS. 3 and 4.

In these Figures, the illustrations on the left show a situation without the invention, and the illustrations on the right show a similar situation in the presence of the invention.

In the absence of the invention, the passenger in the seat Si has placed his portable computer 3 on the shelf 30 mounted on the back of the facing seat Si-1.

On the one hand, the thickness of the portable computer 3 raises the passenger's forearm. In order to reach the keyboard of the computer 3, the passenger must "break" his wrist 31. Conversely, in the presence of the invention, the computer 3 is stored in an ad hoc housing 60 underneath the passenger's seat Si. The passenger's forearm is at the level of the shelf 30. The wrist 31' no longer is broken. In this way the passenger gains in ergonomic comfort.

On the other hand, the screen of the portable computer 3 is located in a low position just above the shelf 30. Moreover, the tilt of the seat in front Si-1 prevents an opening of the screen of the portable computer 3 suited to a convenient viewing by the passenger, that is to say a screen the normal N of which passes more or less at the passenger's eye level. The passenger's vision 32 then is low and his angle of sight (angle between the passenger's sight and the surface of the screen) generally is approximately 120°.

Conversely, by virtue of this invention, the screen of the portable computer 3 is replaced by the IFE screen 11 the position of which on the back of the seat in front Si-1 is appropriate for comfortable vision for the passenger. Since the IFE screen 11 is movable on the back of the seat Si-1, it can be positioned so that its normal N passes more or less at the passenger's eye level (angle of sight=90°) for an increased comfort for the passenger. Furthermore, the high position of this screen 11 on the back of the seat favors an easing of stress on the passenger's neck.

The invention claimed is:

1. A system for accessing a personal computer equipment item on board an aircraft, comprising:
   an on-board network over which services are distributed;
   passenger seats, each equipped with an individual passenger interfacing unit for a passenger to interact with the services distributed over the on-board network; and
   a network interface configured to connect the personal computer equipment item of the passenger to the on-board network, wherein
   the system is configured such that the individual passenger interfacing unit and the personal computer equipment item interact through transmission of data over the on-board network based on identification data of an antenna associated with the passenger seat.

2. The system according to claim 1, further comprising at least one data-entry peripheral at the passenger seat, the at least one data-entry peripheral being configured to connect to the on-board network and to interact with the personal computer equipment item through the transmission of data on the on-board network.

3. The system according to claim 2, wherein the data-entry peripheral includes a projector/sensor that projects a virtual keyboard on a flat surface.

4. The system according to any one of the preceding claims, wherein the interface includes a pointer configured to connect to the on-board network and to interact with the personal computer equipment item.

5. The system according to claim 1, wherein the at least one interface includes a display screen.

6. The system according to claim 1, further comprising a housing that accommodates and supplies the personal computer equipment item with the connection to the on-board network.

7. The system according to claim 6, wherein the housing includes an electrical connection configured to supply the personal computer equipment item in an accommodation position.

8. The system according to claim 6, wherein the network interface is a local wireless network provided to the housing.

9. The system according to claim 8, wherein the on-board network is configured to automatically associate the personal computer equipment item with the passenger seat on the basis of identification data that identifies an antenna coupled to the local wireless network provided to the housing.

10. The system according to claim 1, wherein the on-board network is a wireless network and the network interface includes a terminal that provides a wireless connection to the wireless network.

11. An aircraft comprising the system according to claim 1.

12. The system according to claim 1, wherein the services distributed over the on-board network comprise video on demand, music, games, and flight information.

13. The system according to claim 1, wherein the services distributed over the on-board network belong to an In-Flight Entertainment system.

14. The system according to claim 1, wherein the individual passenger interfacing unit of a passenger seat comprises an individual passenger control unit and an individual display screen provided on a back of a seat in front of the passenger seat.

15. A method for accessing a personal computer equipment item on board an aircraft comprising an on-board network, passenger seats, each equipped with an individual passenger interfacing unit for a passenger to interact with services, and at least one interface configured to connect to the personal computer equipment item of the passenger to the on-board network at the passenger seat, the method comprising:
   distributing the services over the on-board network;
   connecting the personal computer equipment item of the passenger to the on-board network; and
   interacting between the individual passenger interfacing unit and the personal computer equipment item through transmission of data over the on-board network based on identification data of an antenna associated with the passenger seat.

16. The method according to claim 15, wherein the services distributed over the on-board network comprise video on demand, music, games, and flight information.

17. The method according to claim 15, wherein the services distributed over the on-board network belong to an In-Flight Entertainment system.

18. The method according to claim 15, wherein the individual passenger interfacing unit of a passenger seat comprises an individual passenger control unit and an individual display screen provided on a back of a seat in front of the passenger seat.

* * * * *